United States Patent
Baillot et al.

(10) Patent No.: US 6,708,142 B1
(45) Date of Patent: Mar. 16, 2004

(54) AUTOMATIC MOTION MODELING OF RIGID BODIES USING COLLISION DETECTION

(75) Inventors: Yoahan Baillot, Alexandria, VA (US); Jannick Rolland, Orlando, FL (US)

(73) Assignee: University of Central Florida, Orlando, FL (US)

( * ) Notice: Subject to any disclaimer, the term of this patent is extended or adjusted under 35 U.S.C. 154(b) by 0 days.

(21) Appl. No.: 09/482,170

(22) Filed: Jan. 12, 2000

Related U.S. Application Data

(60) Provisional application No. 60/115,908, filed on Jan. 14, 1999.

(51) Int. Cl.[7] .............................................. G06F 17/50
(52) U.S. Cl. ............................... 703/2; 703/8; 700/245; 345/473
(58) Field of Search ...................... 703/2, 5, 7; 345/473; 700/245

(56) References Cited

U.S. PATENT DOCUMENTS

| | | | | |
|---|---|---|---|---|
| 5,343,385 A | * | 8/1994 | Joskowicz et al. | 364/167.01 |
| 5,452,238 A | | 9/1995 | Kramer et al. | 364/578 |
| 5,572,634 A | * | 11/1996 | Duluk, Jr. | 395/119 |
| 5,623,428 A | | 4/1997 | Kunii et al. | 364/578 |
| 5,623,642 A | | 4/1997 | Katz et al. | 395/500 |
| 5,625,575 A | | 4/1997 | Goyal et al. | 364/578 |
| 5,625,577 A | | 4/1997 | Kunii et al. | 364/578 |
| 6,067,096 A | * | 5/2000 | Nagle | 345/473 |

* cited by examiner

Primary Examiner—Samuel Broda
Assistant Examiner—Thai Phan
(74) Attorney, Agent, or Firm—Brian S. Steinberger; Law Offices of Brian S. Steinberger, P.A.

(57) ABSTRACT

An algorithim for modeling the interaction of two colliding rigid objects. The algorithm allows the search of the optimal position and stabilization of two rigid objects when they are in contact due to a force pushing them against each other. The method does use mathematical integration and does not use any initial acceleration or speed conditioning for the results. The pushing direction can be changed at any time of the search for a correct specification. The moving solid is translated and rotated incrementally toward the equilibrium position and orientation in a non-natural way but leading to the same final attitude in a large range of initial conditions. One important novelty of this algorithm is the modeling of rotations involved for the moving object to go toward the natural position and orientation it should adopt. This can be done by the detection of torque during the search and the determination of the center of rotation in a quadratic time. Modeling software can use this algorithm to build animation of an object falling against another along a specific direction by displaying the objects at specific conditions. Biomedical modeling software can use this algorithm to model the kinematic motion of a joint by applying the algorithm on the range of the different degrees of freedom.

10 Claims, 14 Drawing Sheets b < T2 a < T2

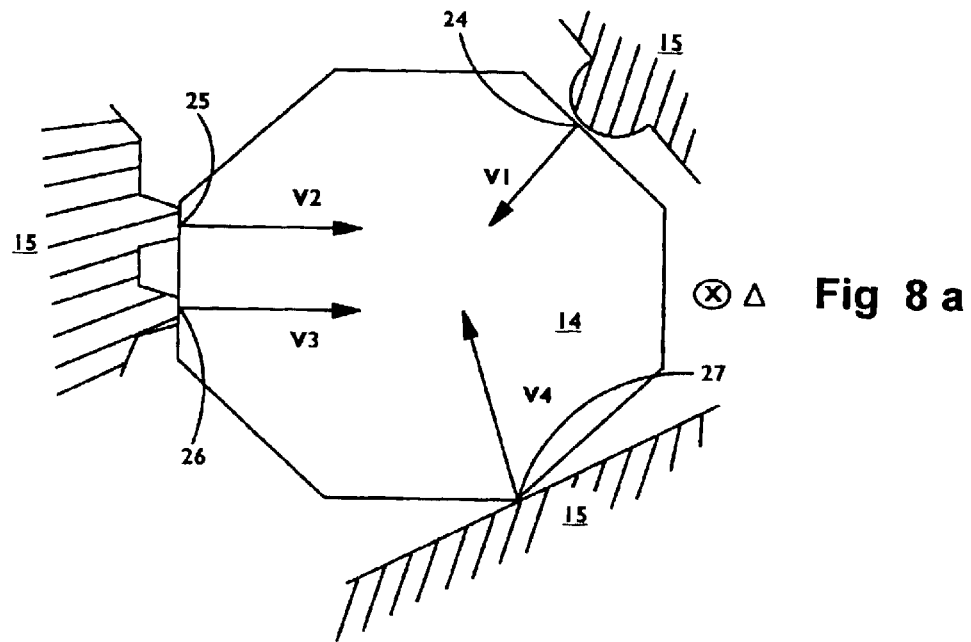
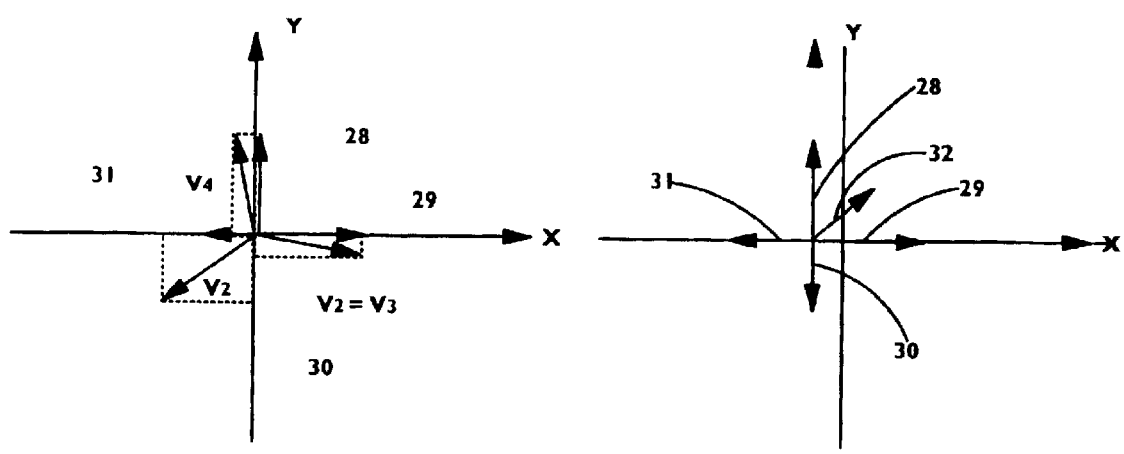
Fig 8 b                    Fig 9

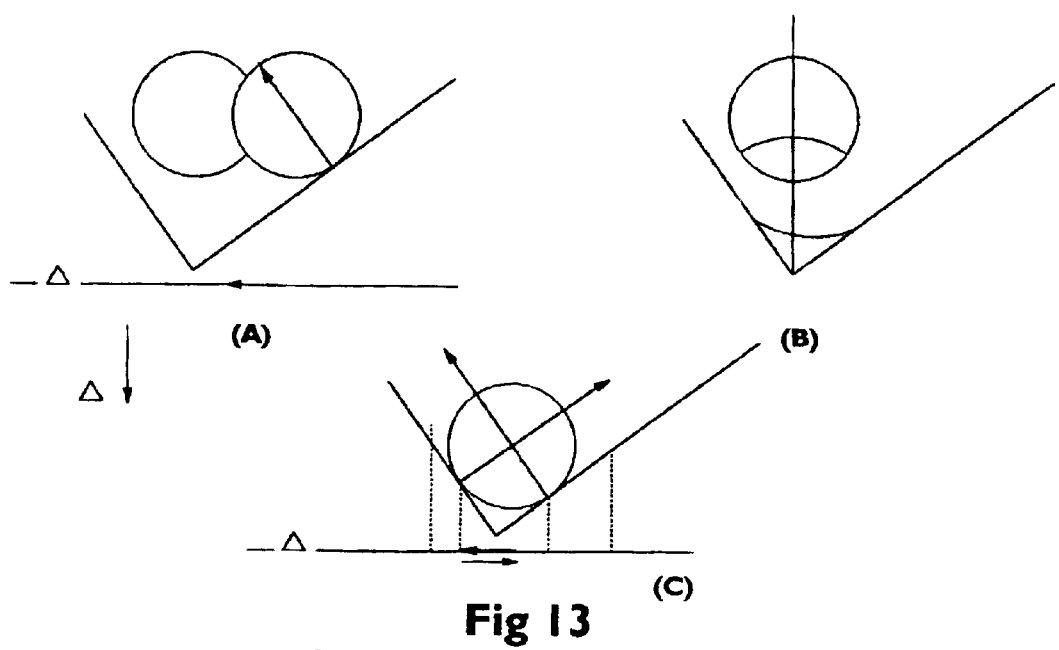
Fig 13
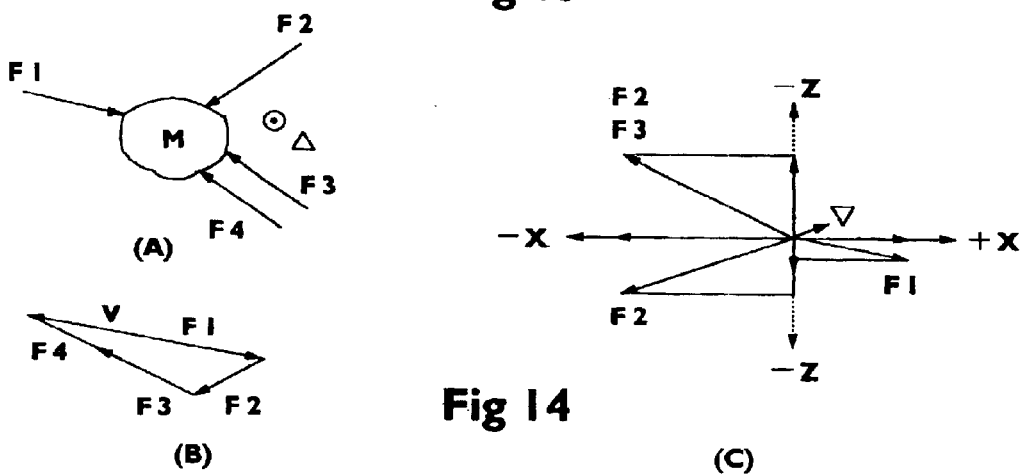
Fig 14
Fig 15
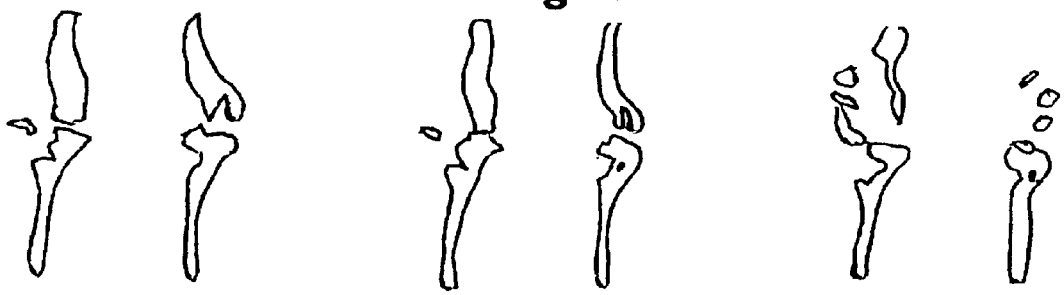

AUTOMATIC MOTION MODELING OF RIGID BODIES USING COLLISION DETECTION

This invention relates to an algorithm for the motion modeling of rigid bodies using collision detection, and in particular to a physically based method on the use of collision detection to achieve stable position and orientation of the joint components to a given attitude and this Application claims the priority of U.S. Provisional Application Serial No. 60/115908, filed on Jan. 14,1999 and was funded in part by an award of the National Institute of Health Number 1-R29-LM06322-01A1.

BACKGROUND AND PRIOR ART

With the advent of computers, there have been many systems developed to model the physical world including the simulation of automatic assembly operations, control strategies for robotics systems, vehicular crash simulations, modeling of molecular interactions, behavior of granular flow, etc. The common thread in most systems is the need for realistic and efficient modeling of the contact between objects.

In the medical field, there is an urgent need for an automatic modeling method to model the motion of anatomical joints. Although motion modeling for joints is known (see Goyal et al, U.S. Pat. No. 5,625,575 at column 1, lines 56–57 as well as: Kramer et al, U.S. Pat. No. 5,452,238; Kunii et al, U.S. Pat. No. 5,623,428; Katz let al, U.S. Pat. No. 5,623,642; and, Kunii et al, U.S. Pat. No. 5,625,577) all patents require parameters such as speed, acceleration and mass defined.

SUMMARY OF THE INVENTION

The first objective of the present invention is to provide an algorithm for the motion modeling of rigid bodies using collision detection.

The second objective of this invention is to provide a physically based method for modeling a collision input between two three-dimensional objects.

The third objective of this invention is to provide a range of motion method wherein it is divided into a series of steps that are recorded and subsequently used for simulation of the range.

The fourth objective of this invention is to provide a series of original incremental algorithms to provide the base of a modeling algorithm.

In an essential embodiment of the invention which relates to a physically based method on the use of collision detection to achieve stable position and orientation of the joint components to a given attitude there is provided a method of modeling a collision input between two three-dimensional objects comprising the steps of: pushing at least one three-dimensional object to another three-dimensional object; determining an x, y and z direction of the at least one pushed three-dimensional object; identify x, y and z input points of the at least one pushed three-dimensional object and the another three-dimensional object; and, modeling the pushing direction and input collision without using laws of dynamics such as but not limited to speed, acceleration, object mass and initial object positions.

Further objects and advantages of this invention will be apparent from the following detailed description of a presently preferred embodiment, which is illustrated schematically in the accompanying drawings.

BRIEF DESCRIPTION OF THE FIGURES

FIGS. 8a and 8b illustrate the moving object touching the fixed object and the resulting vectors.

FIG. 9 illustrates the vector resulting from the sum of the vectors shown in FIG. 8b.

FIG. 13 illustrates a use of the normal to determine the next motion to perform toward the optimal position.

FIGS. 14a–14c shows how the vectors are combined in the plane perpendicular to a to obtain the resultant.

FIG. 15 shows several views of the knee joint model done by varying the flexion angle.

DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

The method of the invention relies on the use of an original algorithm to find the stable position and orientation of two rigid bodies in contact. It is realized by first modeling the motion of anatomical joints and then describing the novel algorithm features in detail. The method consists in first dividing the range of motion into motion steps. In the case of the knee for example, the varus/valgus and flexion/extension motions will be divided into small angle slices of one degree. Each attitude of the joint, characterized by a varus/valgus angle and a flexion angle will then be a motion step. At each motion step, the stable position and orientation of the bones of the joint will be searched, considering that the bones are pushed along a direction that is called Δ. Once a stable position and orientation is found for a motion step, the position and orientation of the bones will be recorded in a lookup table indexed by the entry angles. This lookup table is then used during the simulation. The table is a two dimensional array having 6 fields horizontally for each vertically entry: 3 orientations (around x, y and z); and, 3 translations (along x, y and z) recording the attitude of a component with respect to another component for a given motion step.

To perform the search at each motion step, an original incremental algorithm was developed The algorithm is described in the following pages in general and in detail in the pages 11 to 18. The algorithm works on two rigid (solid) bodies, which means that the geometrical models do not change in shape and size during the process. One is a fixed rigid object and is called the reference; and, the other is a moving rigid object and called the moving object.

Figure 1:
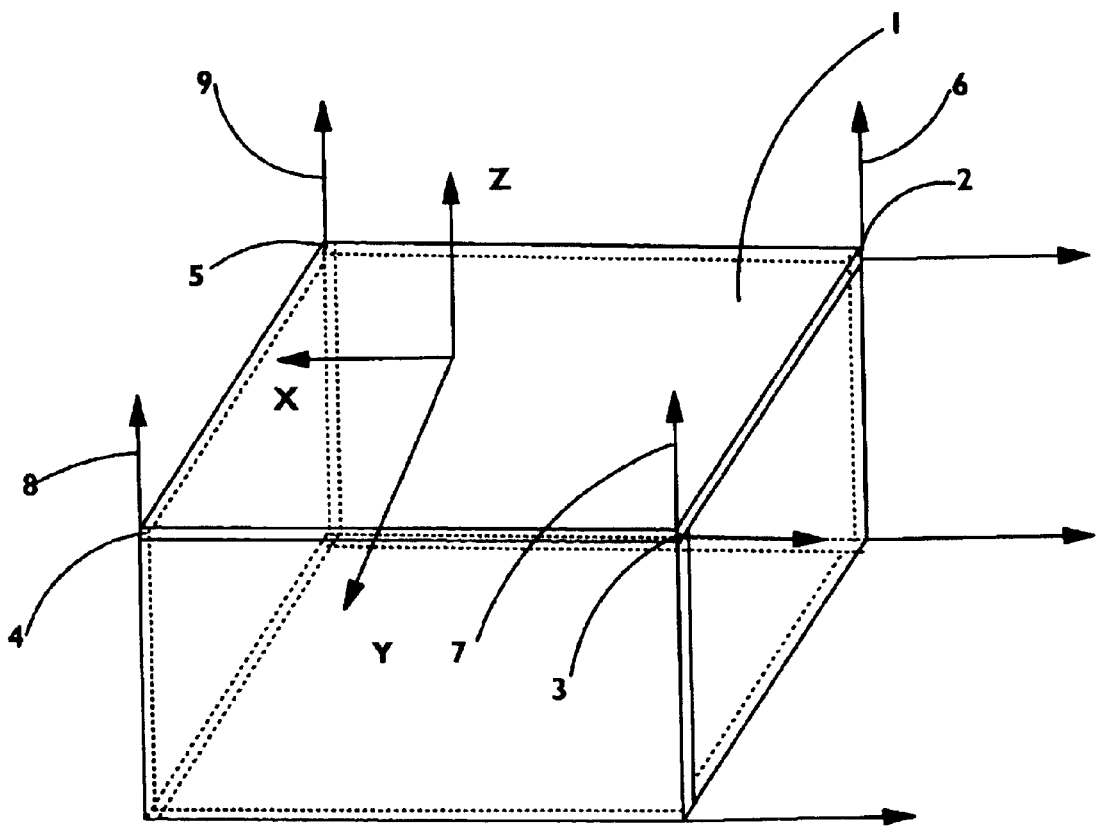
FIG. 1 is a cube for illustration of the terminology of the disclosure herein.

At this moment some definitions are provided to facilitate understanding of this disclosure. A rigid body is a graphical representation of an object established as rigid by the use of primitives. Primitive is defined as a geometrical item defined by a group of coordinates or a formula. For example the rigid body of FIG. 1 is cube shaped and composed of six primitives (faces) that are defined using four vertices for each face. Local referential is when each body used in the modeling has a referential attached to it that is manipulated to move the object. Flexion/extension is defined as two condyles touching.

The normal relates to the surface of the face, e.g., the cube of FIG. 1 has six faces where 1 designates one of these faces. 2,3 and 4 are the vertices describing the face of 1. Each vertex is associated with a normal to the surface of the vertex. The normals for 2, 3, 4 and 5 are 6, 7, 8 and 9, respectively. The normals are defined outward on the solid represented. For the algorithm, the normals are defined inward for the moving rigid body and outward for the fixed rigid body.

Figure 2:
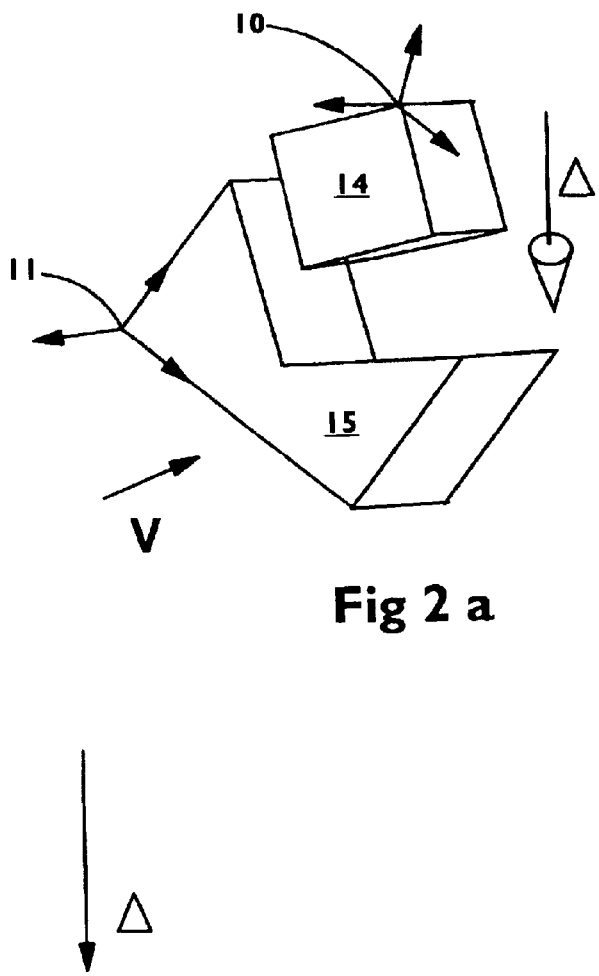
FIGS. 2a and 2b illustrate the dynamic relationship of the movable solid object to the fixed solid object.
Figure 2:
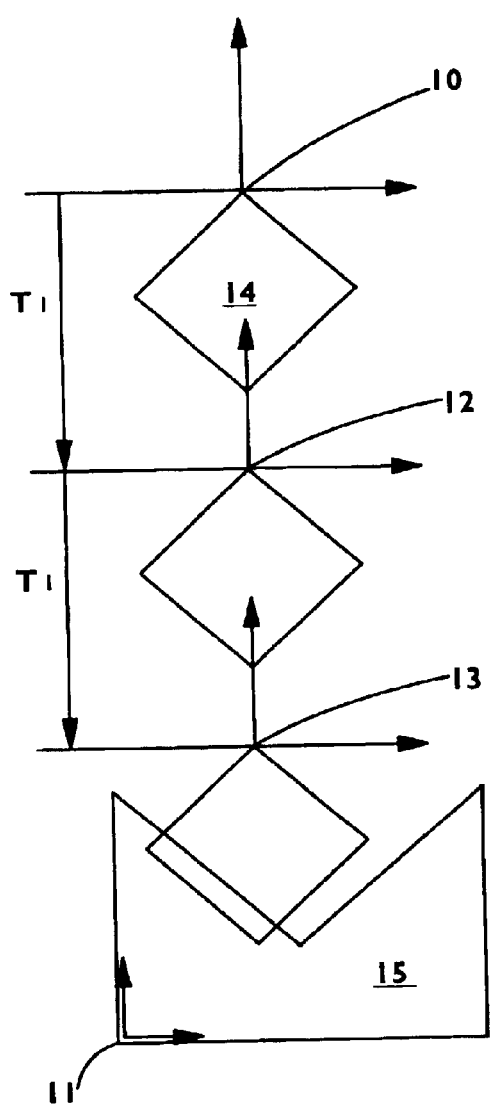

Referring now to FIGS. 2a and 2b, in the initial state, the fixed object (15) and the moving object (14) are placed in such relative positions that the two solids will collide when moved toward each other along Δ and their orientation around Δ is the only orientation that can change toward a stable relative position and orientation of the two solids when pushed toward each other along A. In other words, the orientation of the rigid bodies must conform to the outcome that the rigid bodies will reach an equilibrium position and orientation via a combination of translations in any direction and some potential rotations around Δ. It is to be noted that Δ can and does change as required at each modeling step. V is the viewing position adjacent to FIG. 1a which is provided to see the view represented in FIG. 1b. The moving solid object 14 is translated by steps of amplitude such as translations T1 through T10, T12 and T13. In step T13, the moving solid 14 collides with fixed object 15 . The test is satisfied when a touching position is found. The touching position is that condition when the solids are between colliding and not colliding.

Figure 3:
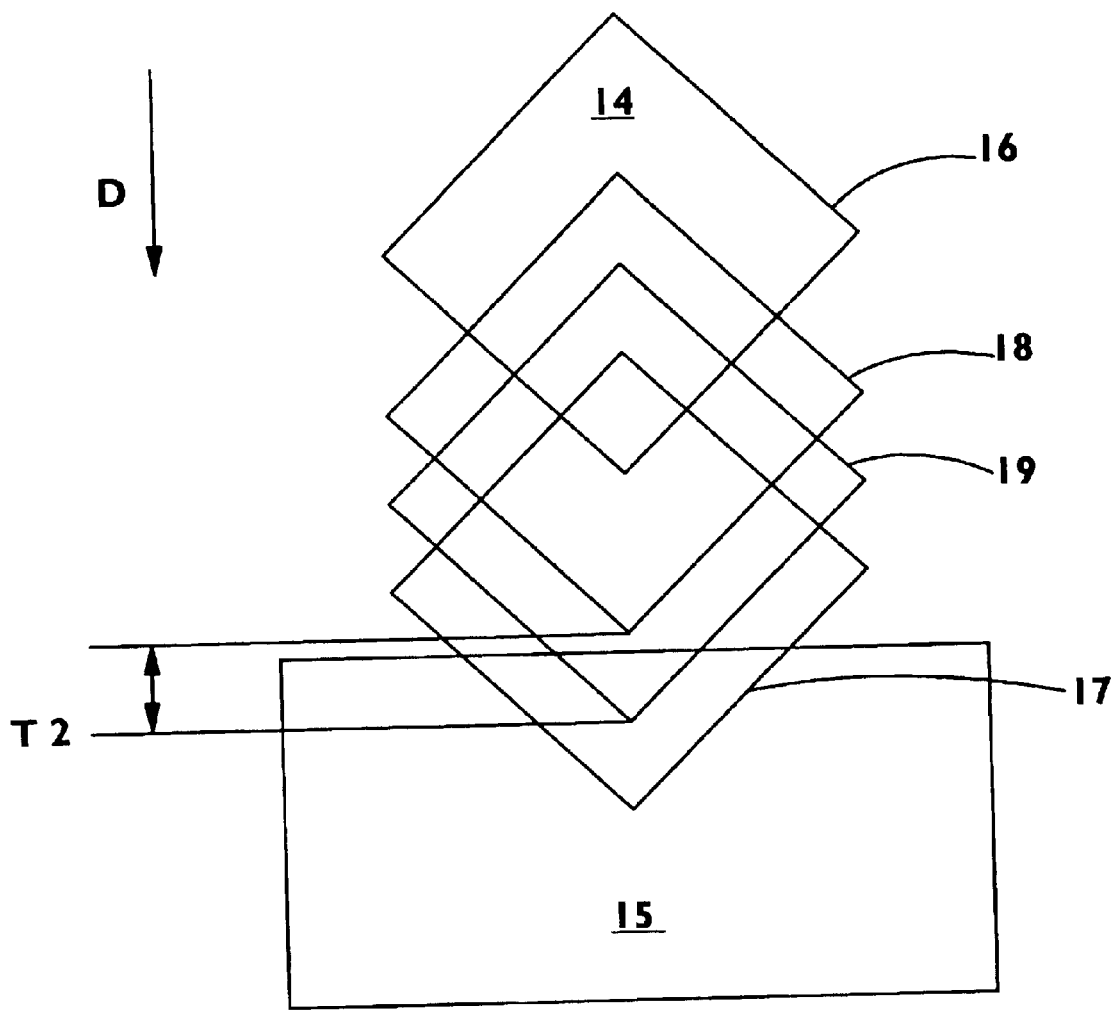
FIGS. 3a and 3b further illustrate the relationship of FIG. 2.
Figure 3:
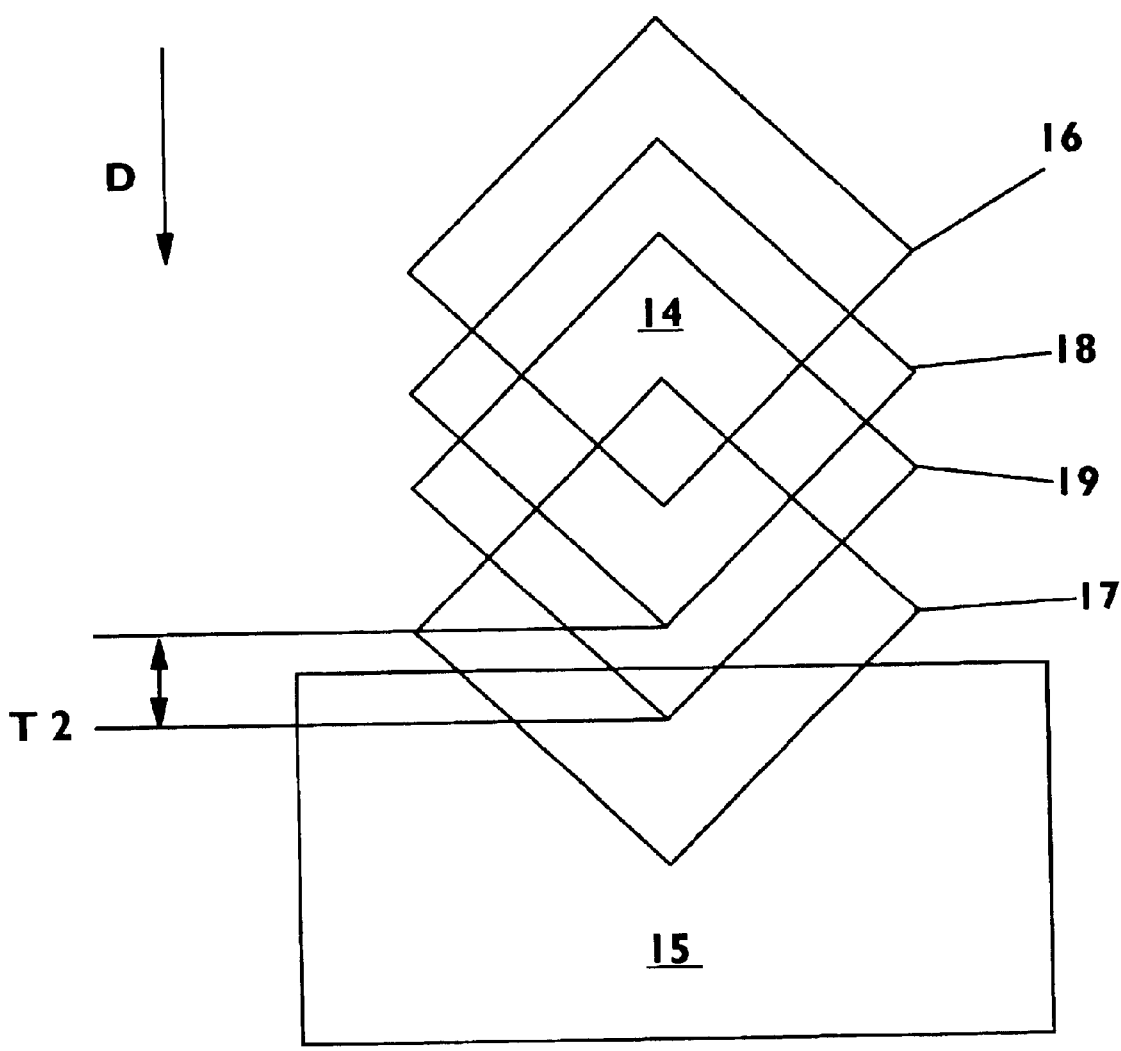
Figure 4:
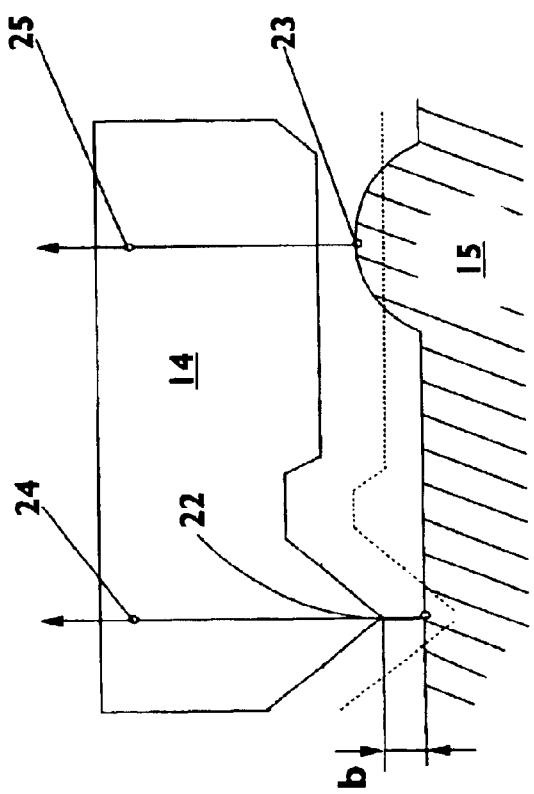
FIGS. 4a and 4b picture the movable object first in contact; and, then not in contact with the fixed object.
Figure 4:
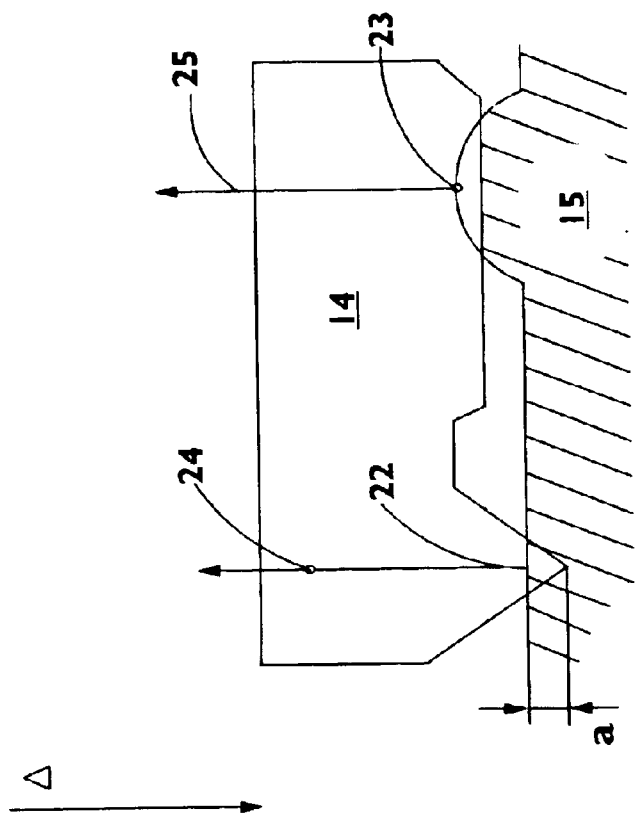
Figure 5:
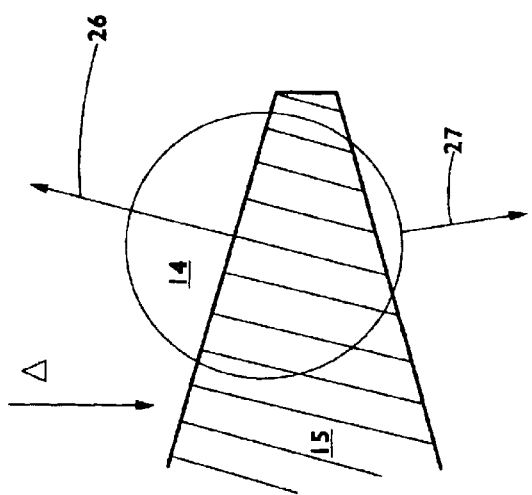
FIG. 5a shows the normals arising from the movable object contacting the fixed object.
FIG. 5b pictures the backfacing normals arising from said contact.
Figure 5:
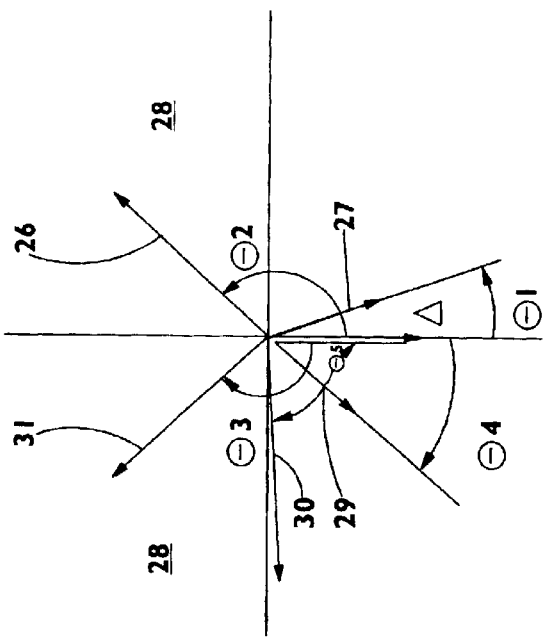

The search of the touching position is done using a dichotomy on the last translation which was indicated as T13 in FIG. 1b. Refer now to FIG. 3a and FIG. 3b which show this last translation as having direction D. Again the moving object is 14 and the fixed object is 15. The search by dichotomy is done by first initialising the stepsize of the dichotomy as a vector opposite to D and equal to half of its amplitude. At each step of the dichotomy: move the object 14 along the vector stepsize determined; if the objects (fixed 15 and moving 14) collide then keep the same direction for the vector stepsize otherwise take the opposite direction; and then take half the amplitude of the vector stepsize. The dichotomy search stops when the vector stepsize amplitude is less than T2, a user defined threshold, insuring that the solid objects remain appart or contiguous within a tolerance T2. Numbers 16, 17, 18 and 19 on FIGS. 3a and 3b represent the successive positions of moving object 14. After a search by dichotomy on the last translation, the solid objects 14 and 15 can be colliding as in FIG. 5a or not colliding as in FIG. 5b. In the case where the solids are not colliding, they will have to be set into collision in direction Δ using the last stepsize used for the dichotomy.

A collision detection engine directing the primitives intersecting and extracting the contact points has to be used. Once the contact points 22 and 23 of FIGS. 5a and 5b are determined, the normals are taken at the application points corresponding to the contact point. The normal must be taken on the solid of least curvature at each contact point. Since the normals on the moving solid 14 are inward, the normals appear to be always going outward of the fixed solid 14. The normals in the case of FIGS. 5a and 5b are 24 and 25. An example of the determination of the normals at the contact point can be done by determining the intersecting primitives and taking the center of each primitive as normal on the objects of least curvature at each of the contact points.

The dichotomy on the rotation is the same as that when the dichotomy is on an orientation change of the moving solid 14 with respect to the fixed solid 15.

FIG. 5a shows the collision of a moving object 14 going down on a fixed object 15 and the produced normals due to due to collision 27 must be eliminated because it is in the same direction as Δ (27 is Δa backfacing normal). To do the elimination, the angle θ between each normal and the direction Δ is computed. Each normal with θ less than 90 degrees is eliminated. In the related diagram FIG. 5b, normals 26 and 31 having angles θ2 and θ3, respectively, are kept with normals 27, 29 and 30 having angles θ1, θ4 and θ5, respectively, (since each is lower than 90 degrees) are eliminated.

Figure 6:
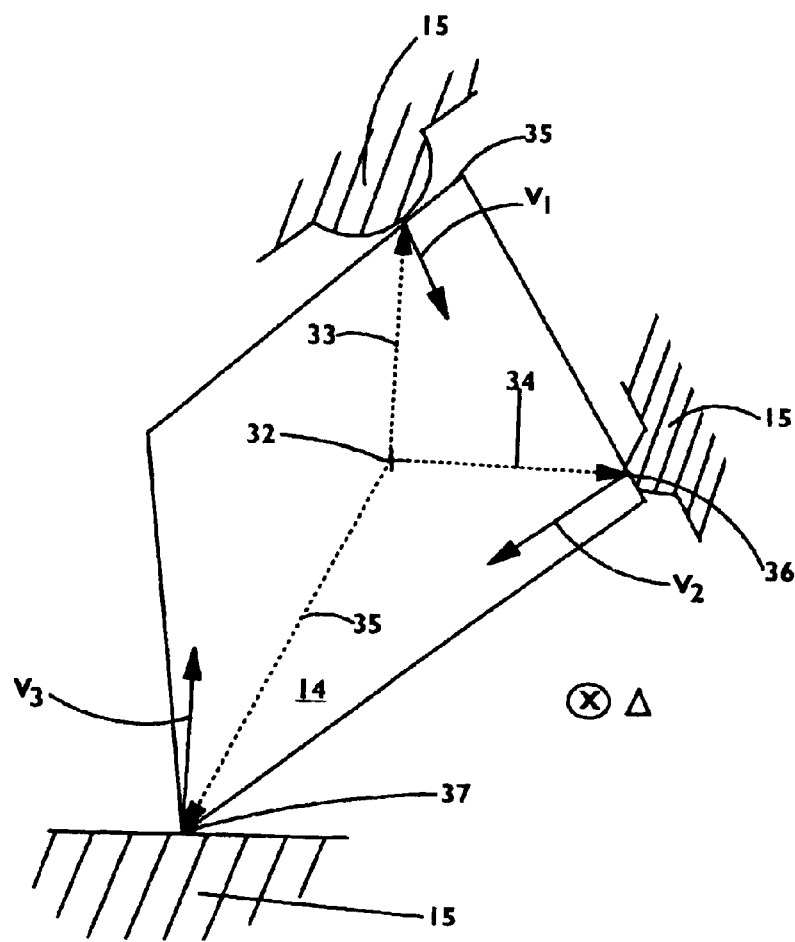
FIGS. 6a and 6b illustrate barycenters.
Figure 6:
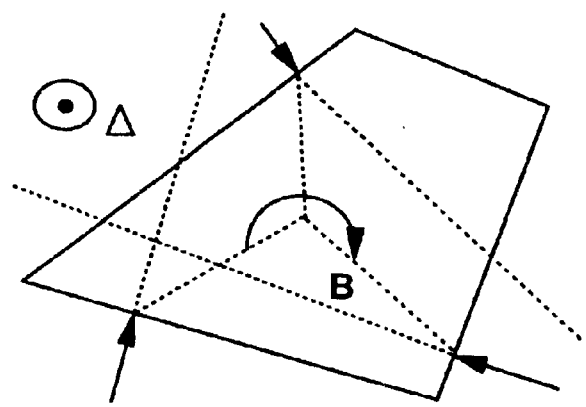

This view in FIG. 6 is shown as seen from the direction of Δ Again, 15 is the fixed rigid body and 14 is the moving rigid body. The normals V1, V2 and V3 have been chosen with respective application points 35, 36 and 37. The barycenter 32 of the application points is tested as a potential center of rotation. The barycenter B is determined by averaging the coordinates of all the application points. It can be a center of rotation if all the forces produce a moment of same sign around it. If this is the case, the barycenter is the point through which the axis of rotation passes as illustrated in FIG. 6a. The moment of each application point is determined by doing the cross product between the vector from the potential V1 at the application point. In the case of the FIG. 6b, the cross products of: 33 and V1; 34 and V2; 35 and V3; respectively, are all of the same sign so the barycenter 32 can be the center of rotation. To further identify any additional barycenters, one applies the same procedure used above to each contact point taken individually. Then take each barycenter defined by the contact points to see if it can be center of rotation and then verify if this barycenter can be the center of rotation. If yes, rotate. Looking now at FIG. 7, it is pointed out that 40 and 39 can be the center of rotation but not 38. The barycenter 44 of 40 and 39 is taken as a center of rotation to rotate the moving solid 14 away from the fixed solid object 15.

In FIG. 8, the moving object 14 is touching the fixed object 15 at points 24, 25, 26 and 27 producing the vectors V1 through V9. Averaging the vectors along the +X, −X, +Y and −Y directions produces the vectors.29, 31 28 and 30, respectively as shown in FIG. 8b. Finally, in FIG. 9, it is shown that the sum of the four average vectors 29, 31, 28 and 30 produces the vector 32. Vector 32 is the predicted motion of the moving object. In this case, the predicted motion of the moving object is wrong but the dichotomy on the last motion as earlier described will finally make the moving solid stable.

Figure 10:
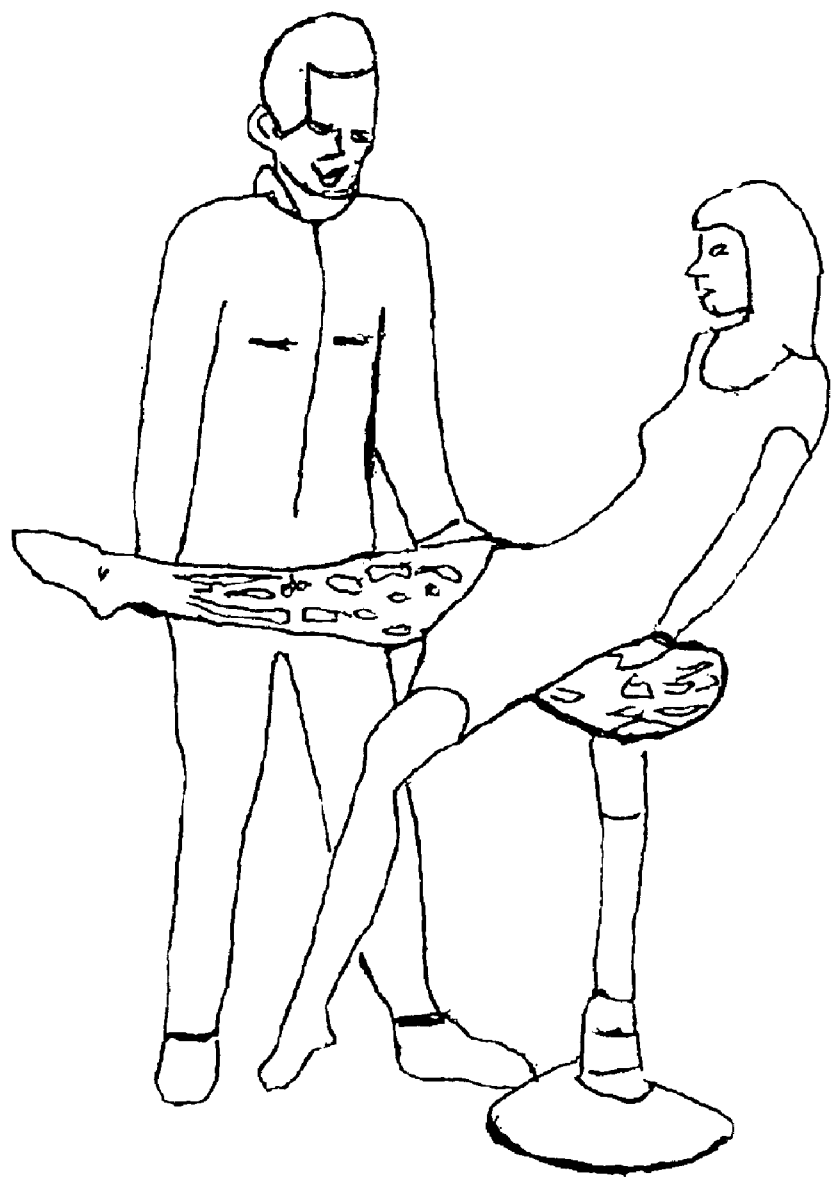
FIG. 10 is an artistic view of the Virtual Reality Dynamic Anatomy tool (VRDA) in use.

Now that the mechanical aspects of creating the algorithm have been set forth in the foregoing detailed disclosure, it is appropriate that consideration be given to its application in practice. FIG. 10 is an artistic representation of the VRDA tool (reproduced by the courtesy of André Sate, UNC-CH), which has provided for the modeling of joint motion. The purpose of the tool is to allow a user who manipulates the joint of a subject to simultaneously visualize a virtual model of the inner anatomy as illustrated in FIG. 10. A feature of the teaching hereafter utilizes an exact collision detection provided by the described algorithm to perform the automatic modeling of the joint kinematics based on the geometry of the bone model. Real-time rendering in a virtual environment for the VRDA tool will be achieved by interpolation of the parameters generated during the off-line modeling procedure. This modeling method is extensible to other joints of the human body by adjusting some of the parameters specific to a given joint type. Even though the muscle deformations are not represented, it is assumed that the muscles initiate the joint motion. In the knee joint for example, the anterior cruciate, posterior cruciate, and the lateral ligaments constrain the patella, the femur, and the tibia to a stable configuration. It is then assumed that the geometry of the contact surfaces conditions the degrees of freedom and the range of motion of a joint.

During the real-time use of the VRDA tool, the position of a reference point and the orientation of the elements of the considered joint of a human subject under no load is determined using optical tracking. These programs will drive the motion of the virtual model accordingly. As a consequence, it is only necessary to specify the joint motion at the kinematic level. It is not chosen to model the forces exerted by the ligaments that would make the problem dynamic. Instead, the ligaments are considered to produce a resulting force whose direction is assumed to be constant. This direction is taken along the main axis of the tibia and will be referenced as $\Delta$ in the remainder of this teaching. A determination for each given attitude of the joint in the optimal position and orientation of the bones with respect to each other is made as if one was pushing them together along this specific direction.

During the use of the VRDA tool, the joint of a model patient is under no load since a user manipulates it. Thus in the simulation no concern is given to the dynamics except that the normals at the contact points are considered to be in the same direction as the reaction forces used in dynamics. Since the algorithm taught herein considers the direction of the reaction forces and nothing else, it is neither dependent upon the initial conditions of position and speed nor upon the reaction forces amplitude.

The exact collision detection is chosen to determine the polygons of the geometric models that are intersecting in a given attitude; that is, an orientation and a position with respect to a referential. The described incremental modeling algorithm fully detailed in the preceding discussion uses this information to make the joint elements slide against each other in a final stable position and orientation. Because the cartilage's deformation is not resolvable at typical viewing distance of the model, it will be considered to be part of the rigid body to which it is attached. Although the menisci deforms as the knee is flexed and participates to the support of the load, its behavior is not referenced. In a first representation of the knee joint, it, is assumed that it is a part of the rigid body of the tibia. A C library called RAPID developed at the University of North Carolina (UNC) is used to solve the problem of finding the collisions (collision engine). This library returns the list of the intersecting triangles of colliding geometric rigid body models as the geometric bone models.

Figure 11:
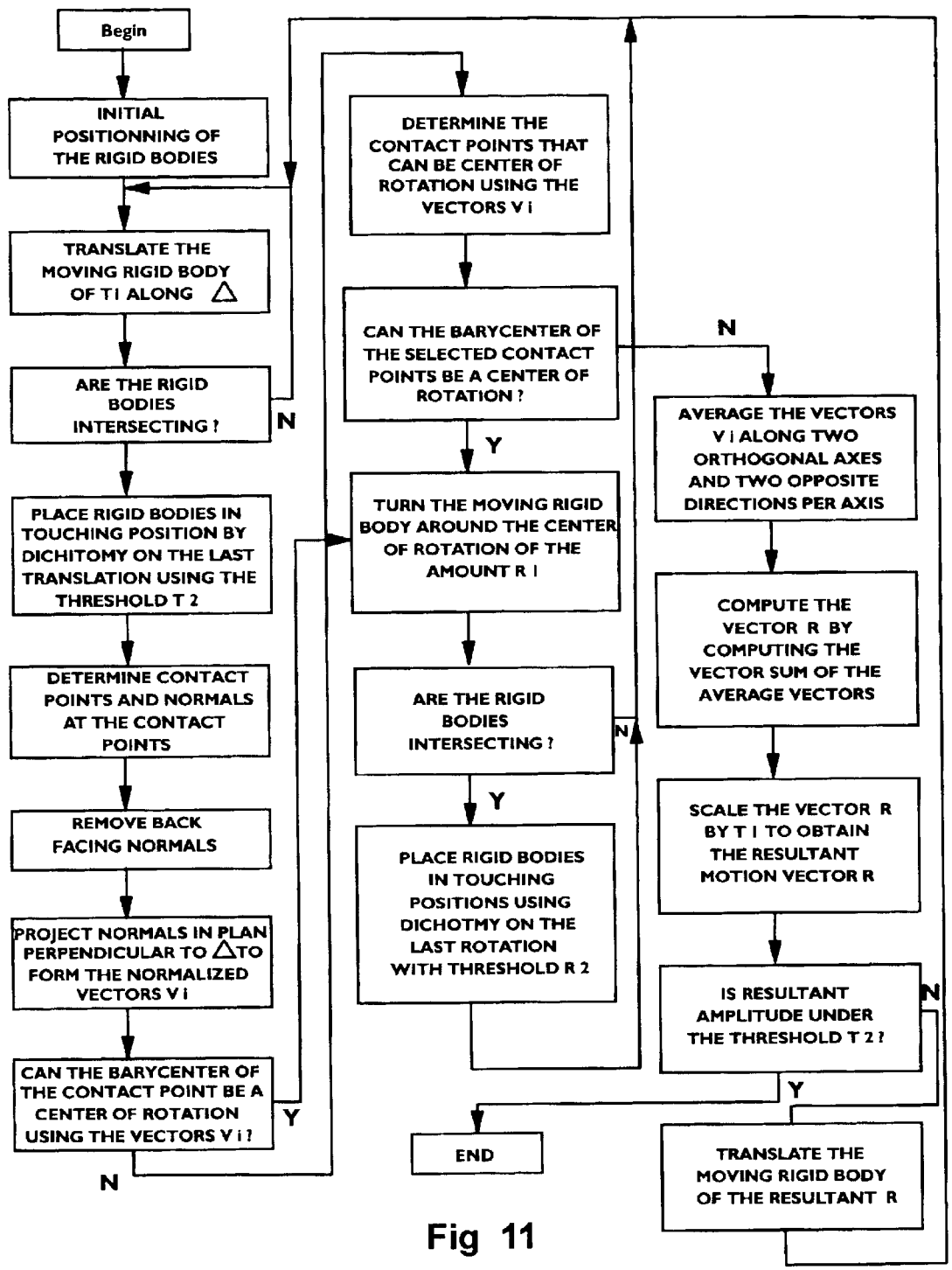
FIG. 11 is a flow chart summarizing the use of the VDRA tool to provide a modeling algorithm for a knee where the femur is the reference and the patella and tibia are moved against the femur.

FIG. 11 shows a flow chart of the working principle of the algorithm, which is a search of a stable relative position and orientation of two rigid bodies. A typical modeling step consists in detecting the collision of the rigid bodies and removing the rigid bodies out of collision to establish exact contact. The contact points and the normals at these contact points are determined. By combining the normals, the algorithm determines the next motion, which can be a rotation, a translation, or the stability of the moving solid. The algorithm moves the solid along $\Delta$ when there is no collision. Therefore, upon collision, the translation occurs in a plane perpendicular to $\Delta$ and the rotation is produced around $\Delta$.

A polygonal model is transformed in triangle primitives whose normals are pre-computed and stored by using the cross product of the two vectors along the sides of each triangle. The normals of the models being specified for each vertex are averaged to obtain the normal at the center of the triangle. These vectors give the directions and application points of the reaction forces that appear when collision occurs between two rigid bodies. These also indicate the direction in which to move the rigid bodies to stop the collision. The algorithm combines this information to determine the next positions and orientations of the rigid bodies to ward the optimal attitude without using laws of dynamics. The present algorithm does not take the exact intersection points as the application point of the reaction forces but rather takes the pre-computed center of each colliding triangle on the fixed rigid body. This simplification is valid herein because the resolution of the contacting surface triangles is in the order of the modeling resolution. An additional procedure could determine the exact contact points by solving the locations of the intersection of the segments of a triangle with the surface of another by determining the correct normal by interpolation at the computed points. Yet another alternative to determine a better approximation of the contact points would be achieved by subdividing the triangles into smaller ones, but this would increase the computational complexity.

Collision detection is a subject that has been largely studied and there are algorithms adapted to different types of graphical objects such as polygon-based, NURBS-based, rigid, or deformable models. The algorithm developed and taught herein can employ any of the existing collision algorithms depending upon the type of graphical model considered.

One of the rigid bodies, called the reference, is fixed in space. The other rigid bodies are translated toward and slid against the reference in order to find their optimal position and orientation given that the motion is constrained along some degrees of freedom as fully discussed in the description of FIGS. 1 through 9. In a more specific discussion, for example, in the case of the knee, the femur is designated as a reference and the patella and tibia are moved against the femur during the modeling. The flow chart of the working principle of the algorithm is depicted in FIG. 11.

To compute the correct motions resulting from the collisions, the algorithm must use the normal of the object having the largest radius of curvature at each contact point. In effect, the use of the normal of an arbitrary rigid body can lead to an error in the predicted direction of motion. A connectivity graph of each rigid body would help to determine which ones verify this condition at each contact point by computing the dot product of the normals of adjacent contacting surfaces to estimate the radius of curvature. Then, the normals that do not belong to the moving rigid body must be negated and their associated contact points must be rotated. In our case, the modeling of the knee, the femur condyles have been assumed to have the largest radius of curvature since the condyles are expected to lay on the menisci's edges that have small radius. Thus, in this specific application, there is no estimation of the radius of curvature of the contacting surfaces: the normals are always taken on the femur, which is the reference. The normals directed in the half plane perpendicular to the direction of motion must be also eliminated because they will contribute to make the moving rigid body go through the fixed rigid body instead of pushing it away. These normals can be detected when, after a collision, one of the surfaces of the backside of the fixed rigid body is crossed. The removal of these normals is done by detecting the normals giving a negative dot product when combined with the vector of the direction of motion.

In the algorithm described hereafter, exact contact is performed when a collision occurs during the last motion step which can be a translation or a rotation. In order to establish exact contact, a dichotomic search is performed on the range of the last motion until the step size of the search is less than the modeling resolution. Because there are two types of motions, rotation and translation, exact contact can be searched for each motion. Note that both motions have their own dedicated modeling steps and resolutions that are set according to the modeling requirements. The search for exact contact using collision detection algorithm can be done effectively by reducing the detection to the first contact. When the contact resolution is reached, the triangles colliding during the last dichotomic step are memorized for use to compute the next motion and the algorithm makes sure the rigid bodies are not in collision. The motion of the moving rigid body is initially set to the estimated direction $\Delta$ of the resulting force that would be produced by the ligaments in a real knee under various manipulation of the joint. A first translation allows placing the solid objects in a preliminary contact. Then, at each step, the procedure verifies if there was collision during the last motion (i.e. translation or rotation). If no collision occurred, the original direction of motion (i.e. translation along $\Delta$) is reestablished. If there was collision, exact contact is done along the last performed motion (translation or rotation) using the previously described dichotomic search for exact contact.

At this point, three scenarios could happen in the physical world: the moving solid could rotate due to a torque, translate, or adopt an equilibrium position. The attitude of $\Delta$ is provided before each search for a position (e.g. for the tibia-femur rigid bodies pair, $\Delta$ is given by the flexion and varus/valgus angles). The moving solid can only translate along $\Delta$ and the plane orthogonal to $\Delta$ and can only rotate around $\Delta$ the other orientations being fixed for a specific given attitude. The translation along $\Delta$ is performed when no collision occurred at the last step. The translation on the plane orthogonal to $\Delta$ is performed if no rotation around $\Delta$ is possible as a result of a torque.

Figure 7:
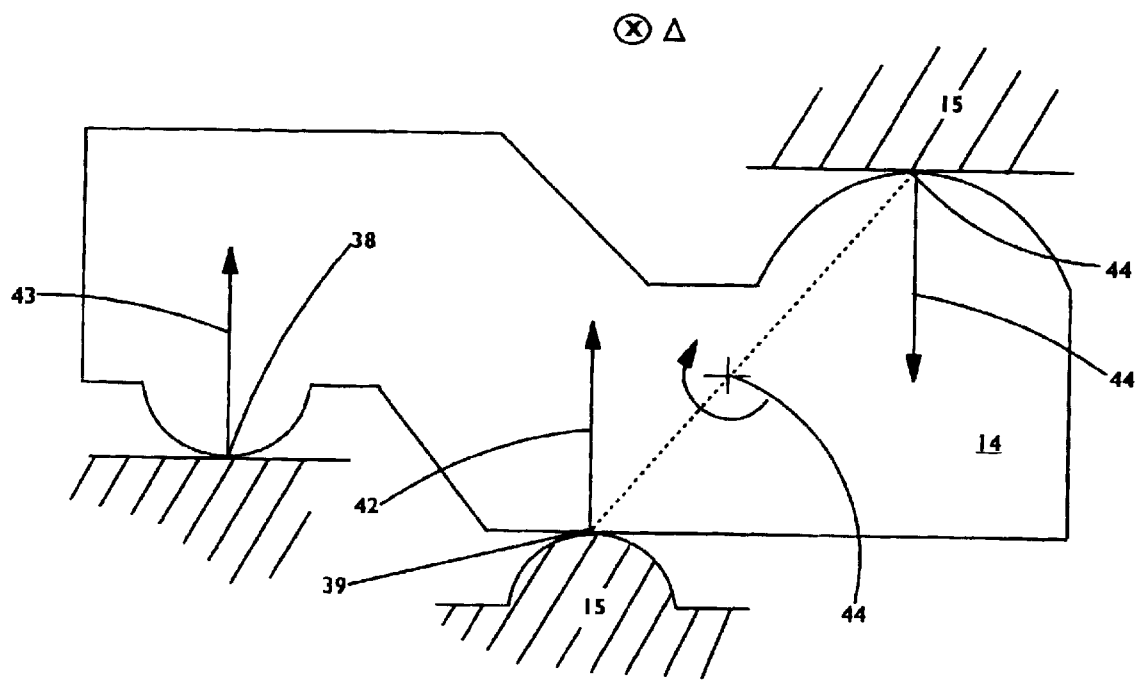
FIG. 7 illustrates the dichotomy on rotation.
Figure 12:
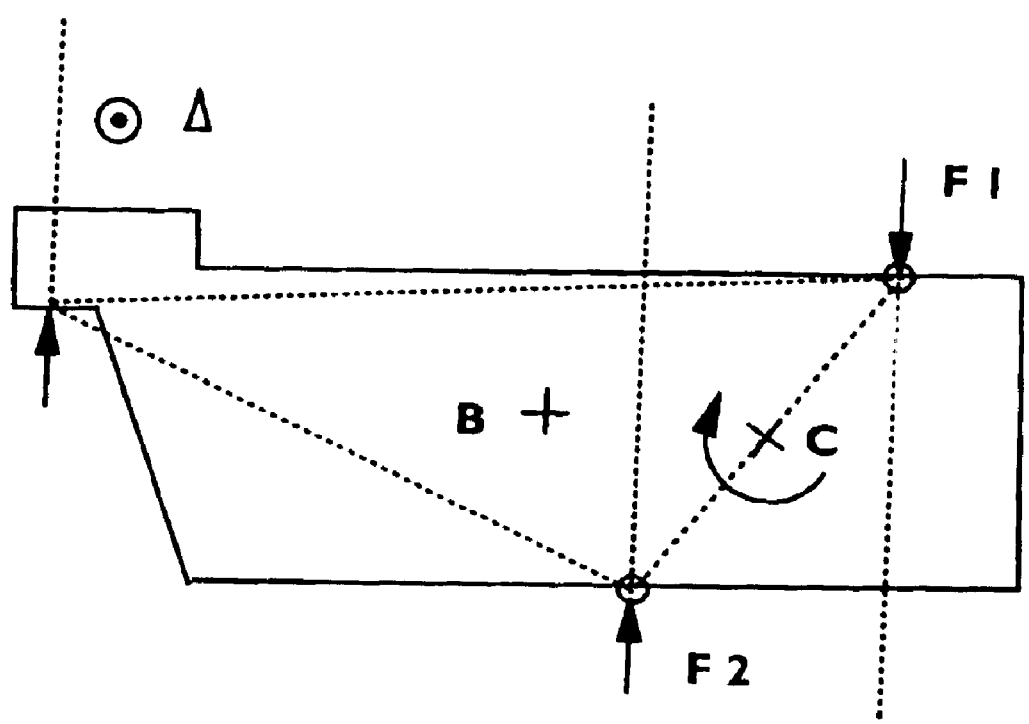
FIG. 12 illustrates where Forces F1 and F2 produce opposite torques around the barycenter B.

The collision detection library and the pre-computed normals of the reference determine the direction and application points of the reaction forces each time the solids are in exact contact. A torque around any axis parallel to $\Delta$ is possible if all the reaction forces produce a torque of the same sign around this axis. If the sign of the torque among the forces changes, the solid body will not turn because the reaction forces will balance each other to produce a null torque. The algorithm verifies whether such an axis exists and computes its location using the application points of the normals in $O(n2)$. First, the algorithm tries to take the barycenter of all the application points as the center of rotation. The barycenter can be a center of rotation if all the forces produce a moment of same sign around it. If this is the case, the barycenter is the point through which the axis of rotation passes as illustrated in FIGS. 7 and 12 where the two opposing forces F1 and F2 produce opposite torques around the barycenter B and the algorithm identifies two application points as potential centers of rotation and takes their barycenter C as the center of rotation. If the barycenter cannot be center of rotation, then each of the application points is tested as a candidate for being the center of rotation using the momentum computation. If several candidates are identified, the barycenter of these candidates is taken as the center and the algorithm verifies this computed center is valid using the momentum. If none of the above techniques lead to a possible center of rotation, then no torque is produced.

If the axis exists, the solid should be rotated around that axis by an amount such that the farthest point of the solid moves on an arc of length that takes the value of the translation modeling step. After the rotation of the moving rigid body has been completed, a new iteration is executed. If collision occurred during the rotation, then exact contact is searched before the algorithm iterates. Because the axis around which the solid is rotated is parallel to $\Delta$, the orientation of $\Delta$ is not altered.

If no torque can be produced, the algorithm attempts to translate the moving solid. In order to determine the resulting motion that should be performed to go toward the stable position, motion vectors are used. The motion vector of a reaction force is defined as the vector of unitary length computed by projecting the reaction force vector against the plane perpendicular to $\Delta$ and normalizing it to one to make the amplitude of motion independent of the slope of the contact surfaces. These vectors are combined using averaging by components (e.g. X, Z) and by sign (e.g. +X, −X) and then averaging the resulting vectors to obtain the resultant motion. This way to combine the vectors has the particularity to remove the duplicates of vectors of same direction and orientation and compute the resulting vector in $O(n)$. The resulting vector is within a circle of radius one on the plane perpendicular to $\Delta$ and is multiplied by the modeling step size to obtain the translation that the moving rigid body must perform. FIG. 13 illustrates the method used in a two dimensional case with a circle falling between two lines. (see FIGS. 13a–c). In this illustration, the three designations of FIG. 13a, 13b and 13c represent the sequence of locations that each circle performs. The horizontal arrows are the normalized projection of the normals at the contact points on the plane perpendicular to $\Delta$. In FIG. 13c, the sum of the vectors is null and the circle is stable.

FIG. 14 shows how the vectors are combined in the plane perpendicular to $\Delta$ to obtain the resultant component average. The average by component method considers four orthogonal directions on the plane perpendicular to $\Delta$. The computed resultant is a better approximation than using the vector sum because it removes the duplicate vectors of same direction and compute the resulting vector in a time proportional to the number of application points. The algorithm multiplies this vector by the modeling step size to obtain the translation that the moving rigid body must perform. As seen in FIG. 14a, a moving object M is viewed along the direction $\Delta$ being submitted to multiple forces (Fx) that do not produce a torque. In FIG. 14b, the vector sum leads to a resultant vector (V) that is too large as a result of the duplicate vectors F3 and F4 whereas is seen in FIG. 14c, the average by component method allows removal of duplicate vectors of the same direction which lead to a better solution.

The described approach searches the stable relative position and orientation around Δ of two rigid objects when pushing them against each other along a defined axis Δ. The algorithm produces a stair-like motion when the solid is moving toward its stability along an inclined surface because the translation along Δ and perpendicularly to Δ is treated separately. The optimal position is reached when the resultant vector is zero. The resulting reaction force is directly opposite to the direction of motion Δ. In an implementation, the optimal position is reached when the resultant vector computed from the motion vector has a normal inferior to the specified resolution.

The described method searches the stable relative position of two rigid bodies M in the plane perpendicular to Δ and their stable orientation around Δ for the equilibrium altitude that would result from pushing the rigid bodies against each other along Δ. In order to perform modeling of two solids moving on a range of motion, one must divide the range of motion into steps and run the described algorithm on each step in order to determine the equilibrium position. In the case of the knee joint, the range of motions is spanned by the flexion and varus/valgus angles. The relative position of the rigid bodies and the orientation of the tibia along its long axis (screw-home) are produced by the modeling algorithm as a consequence of the previous motion and of the geometry of the contacting surfaces. If the steps are small enough, the initial conditions can be taken from the last equilibrium attitude in order to ensure convergence of the algorithm without precomputation of a valid starting position. For example, in the case of the knee joint, it is chosen to start the next modeling step by using the last equilibrium attitude found, which means conservation of the relative positions of the rigid bodies and their relative orientations along the main axis of the tibia.

The method of the invention has been implemented into a multiprocessing application on an SGI Onyx Deskside with two processors at 150 MHz. The procedure used test objects of shape similar to the knee joint or part of the knee joint. A high-resolution geometric model from Viewpoint Inc. was used that included the bones, meniscus, the ligaments, the tendons and the muscles. The model is described as a set of polygons. The bones are extracted as three rigid bodies from the format: the patella, the femur, and the tibia, including the meniscus and the fibula. Each model has been transformed in triangle primitives for suitability with the collision detection engine. The model is described in the vertical position with the patella in front. In this configuration all the bones have their origin at the same location and in the same orientation. Their Y-axis is vertical and goes up, the X-axis is horizontal and goes right, and the Z-axis goes away from the viewer. Two degrees of freedom are considered as entry to the model: the flexion and the varus/valgus angles. For both orientation and translation, a modeling step generally ten times larger than the associated resolution was used. The resolution of the human eye is one arc minute, and the viewing distance of the model in the application is typically 0.5 m. The maximum resolution in translation resolvable by the human eye is about $1.45E^{-4}$, and we set $1E^{-4}$ m as translation resolution and $1E^{-3}$ m as the translation modeling step. To obtain the corresponding resolution for the rotation, it is taken into account that the tibia is enclosed in a circle of $3E^{-2}$ m of radius as the screw-home angle is changed. Then an arc of length $1.45E^{-4}$ m must be produced by an angle of $1.45E^{-4}$ rad or $0.27°$. The orientation resolution and the modeling rotation were each set to $1°$.

The rigid body reference was taken to be the femur. Its coordinate system stays fixed for a fixed viewpoint, and the angles are expressed around its axes. During the review of the biomedical literature, no precise definition of these angles using landmarks of the human body has been found. Therefore, the rotation around the X-axis was considered as the flexion angle, and the rotation around the Z-axis as the varus/valgus angle. These are the motions that could be performed on the joint by one manipulating the knee of the subject. The ranges of orientation of 0 to–90° for the flexion and of +10° to –10° for the varus/valgus are divided in steps of 1°. For each value of these angles, a modeling search is established along a new Δ axis. Once the search for a given attitude is completed their optimal attitude is recorded for real time representation. An illustration of the modeling of the knee joint model done by varying only the X-axis angle that we assume to be the flexion can be seen in FIG. 15.

The precise definition of the axes of the model is not critical in the application described herein, if the tracking and the rendering systems have the same frame of reference, and the modeling has been done on a large enough range. For other applications, it could be modified with better knowledge of the correct axis of rotation without lost of generality. On the other hand, the specification of the Δ axis is important because it conditions the correctness of the motion modeling. The tibia orientation has been kept fixed during the modeling and the femur has been oriented to produce the needed varus/valgus and flexion angles. This approach allowed keeping the axis Δ fixed and equal to the long axis of the tibia (Y-axis) in order to perform the dichotomic search for exact contact quickly and to use the X and Z coordinates directly as projections of vectors on the plane perpendicular to Δ. The normal and their application points were expressed in the frame of reference of the tibia at each step, by applying the rotation of the femur at the current step.

Using the Y-axis of the tibia as Δ assumed that the ligaments produce a force in a direction that is constant and along the long axis of the tibia. If a better estimation of this direction was known, these axes could be adjusted accordingly to obtain more precise results. In this chosen setup, the modeling algorithm uses the geometry of the contacting surfaces to determine the position of the tibia along its X-axis and Z-axis, as well as the internal/external rotation being assumed to be around the Y-axis, gain recall that flexion/extension is defined as two condyles touching. For the patellofemeral joint, the direction against which the patella must be pushed can be found in biomedical data and the same technique can be used.

The multiplicity of steps in producing the algorithm was shown in FIG. 11 where each box contains appropriate language descriptive of the step, the connecting lines have arrow indicia showing the direction of the connecting step to be taken and the Y and N designates Yes and No, respectively.

The complexity of the algorithm proposed is largely reduced compared to a method using the Rigid Body Dynamics because it does not involve integration. Additionally, it does not use force, speed, and acceleration amplitudes. Thus, it is robust, given that it is quasi-independent of the initial conditions. A large range of modeling step sizes and initial relative positions and orientations of the object make the algorithm converge to the same result. In fact, it is postulated that if the initial position of the moving object is such that in reality the two objects would find a stable position, the algorithm of the invention could be shown to converge as well.

In addition, because the design of the algorithm is based on the actual geometry of the object, the algorithm can be employed on any model size and shape. This algorithm could be employed for animation purposes by not showing the steps where the objects are not in contact, thus replacing the stair-like motion by a smooth motion.

In the case of the modeling of an anatomical joint, when the algorithm finds a stable position, a motion step is then completed. The position and orientation of the objects are recorded in a lookup table indexed by the entry angles spanning the degrees of freedom. Then, the modeling algorithm iterates to the next motion step. By using the entry angles of the joint the attitude of the reference object is changed. Finally, the algorithm is applied on the new motion step and when all the motion steps have been considered, the modeling is completed.

Figure 16:
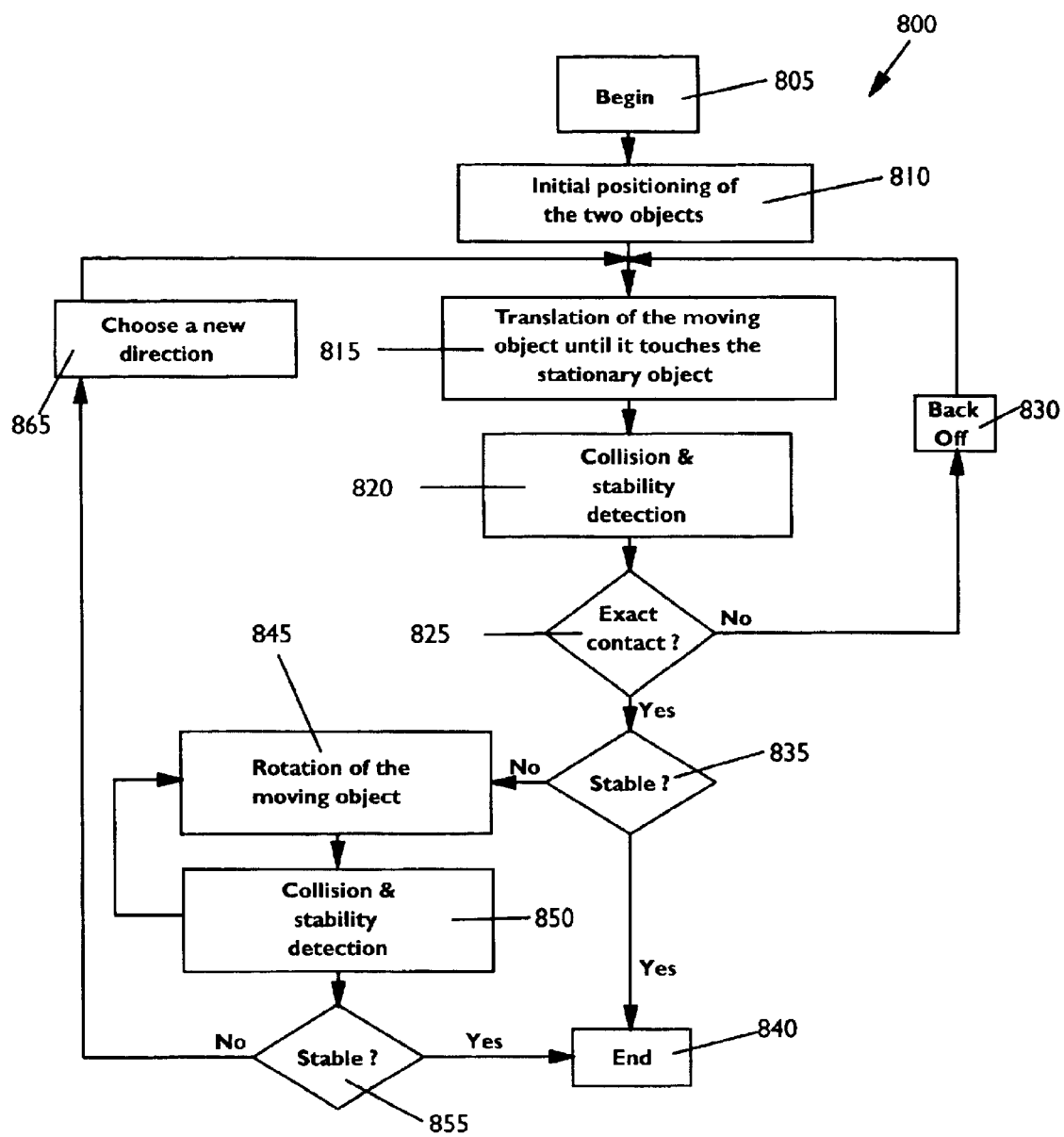
FIG. 16 is another flow chart version of FIG. 11.

FIG. 16 is another flow chart of FIG. 11. The steps of the flow chart will now be described.

805 Begin

810 the algorithm positioned two rigid bodies above each other and define a direction of translation D defined by the direction along which the ligaments produce a force. The direction is taken more precisely along the main axis of the tibia.

815 the algorithm translate one rigid body towards the other rigid body along a direction D until the objects touch. Translation is defined as all points on the rigid body are moving along paths parallel to each other.

820 the algorithm detects collision of the two objects and establish whether the objects are in stable position defined here as translation is not allowed.

835 the last test of the stability algorithm for translation is to establish whether the two objects are in exact contact.

830 if no, return to 815.

835 if yes, check again for stability in rotation, defined as no rotation allowed. Rotation is defined as there is one point, on the rigid body or the extended part of the body, having zero velocity. This point is called the center of rotation with all other points moving along circular paths centered at it.

840 if yes, end.

845 if no, algorithm performs a rotation of one of the rigid bodies with respect to the other.

850 the algorithm detects collision of the two objects and establish whether the objects are in stable position defined here as neither rotation or translation is allowed.

845 if rotation is allowed return to 845 from 850.

855 is no rotation is allowed, check whether a translation is allowed.

840 if the two rigid bodies are in stable position, go to 840 the end.

860 if the two rigid bodies are not stable with respect to translation, choose a new direction of translation and go to 815.

The modeling algorithms of the invention can be run and displayed using the computers of U.S. Pat. No. 5,625,575 to Goyal et al. which is incorporated by reference.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of modeling a collision input and subsequent body motion of two three-dimensional objects after a collision condition occurs between the objects comprising the steps of:

(a i) pushing at least one three-dimensional object to another three-dimensional object;

(a ii) colliding the at least one three dimensional object with the other three-dimensional object;

(b) determining an x, y, z direction of the at least one pushed three-dimensional object after the colliding step (a ii);

(c) identify x, y, z input points of the at least one pushed three-dimensional object and the other three-dimensional object after the colliding step (a ii); and (d) modeling the pushing direction and input collision and next motion of the rigid bodies after the colliding step (a ii), without using laws of dynamics such as but not limited to speed, acceleration, object mass and initial object positions, wherein:

the modeling step (c) includes:

(c i) detecting the collision of the rigid bodies;

(c ii) removing the rigid bodies out of collision;

(c iii) combining the normals; and (c iv) determining a next motion of the modeling step (c) after the collision of the rigid bodies which is selected from one of: rotation, translation, and stabilization; wherein:

said one three-dimensional object is rigid and movable along a translation path and said another three-dimensional object called the reference is rigid and fixed in position, wherein the femur of a knee is designated as said reference and the patella and tibia are moved as said movable objects against the femur during the modeling of the moving knee; and pushing toward said femur is divided into a range of steps for each of the varus/valgus and flexion/extension motions with said steps divided into small angle slices of one degree each; and wherein said normals are always taken on the femur with those normals directed in the half plane perpendicular to the direction of motion eliminated, said eliminated normals being defined by said normals giving a negative dot product when combined with the vector of the direction of motion, said normals are taken in order to determine the proper center of rotation.

2. The method of claim 1 wherein the determining the next motion includes the step of:

testing said contact points as a barycenter in order to determine a potential center of rotation.

3. The method of claim 1 wherein said steps are repeated until stabilization is realized.

4. The method of claim 1 wherein said exact contact points resulting from a motion step being a translation or a rotation is established by a dichotomicic search performed on the range of a previous motion until a step size of the dichotomicic search is less than a modeling resolution.

5. A method of determining positions and orientations of two colliding rigid bodies solely after collision between the bodies, comprising the steps of:

(a i) moving the first rigid object against the second rigid object being fixed in place, prior to the collision condition;

(a ii) detecting a collision condition between a first rigid object colliding with a second rigid object;

(b) calculating contact points on at least one of the first and the second objects, and normal values for the contact points, after the collision condition;

(c) determining a next center of rotation of at least one of the first rigid object and the second rigid object, after the collision condition by normal values for the contact points.

6. The method of claim 5, wherein the step (c) of determining the next motion includes the step of:

determining the next center of rotation from one of: a rotation, a translation, and a stable-equilibrium.

7. The method of claim 5, wherein the step (c) of determining the next center of rotation the steps of:

determining whether the next motion is a translation;

determining whether the next motion is a rotation; and determining whether the motion is at a stable-equilibrium.

8. The method of claim 5, wherein the step of determining the next motion includes the steps of:

determining the next center of rotation of the moving first rigid body solely after the collision of the moving first rigid body and the fixed in place second rigid body.

9. The method of claim 5, wherein the step of determining the next center of rotation includes the step of: determining the next motion without using laws of dynamics of the bodies prior to the collision.

10. The method of claim 9, wherein the laws of dynamics includes at least one of: speed, acceleration, object mass and initial positions of the bodies prior to the collision.

* * * * *